United States Patent Office 2,795,578
Patented June 11, 1957

2,795,578
DISAZO DYES

James F. Feeman, West Reading, Pa., assignor to Althouse Chemical Co., Worcester, Mass., a corporation of Massachusetts No Drawing. Application July 9, 1956,
Serial No. 596,442

8 Claims. (Cl. 260—153)

This invention relates to a new class of disazo compounds, especially useful as dyes for reasons mentioned more fully hereinafter.

The new disazo compounds have the following structure:

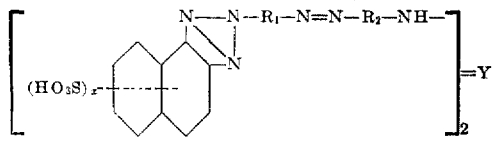

wherein $x$ is a whole number greater than 1 and less than 4; $R_1$ is a radical selected from the group consisting of

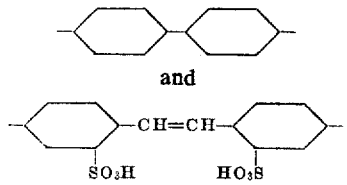

$R_2$ is a radical selected from the group consisting of

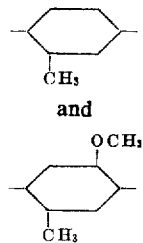

Y is a radical selected from the group consisting of —CO—, —CO—CH=CR$_3$—CO— (wherein $R_3$ is a radical selected from the group consisting of —H, —Br, —Cl and —CH$_3$), and

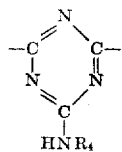

(wherein $R_4$ is a radical selected from the group consisting of —H, —lower alkyl, —phenyl and —lower alkylated phenyl).

The dotted linkages wherever shown indicate bonding of substituent groups to ring nuclei at any available positions in the entire ring structure providing stable linkages.

The triazole structure of the naphthotriazole moiety is sometimes illustrated in the following ways:

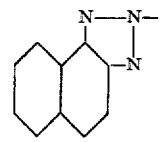

and

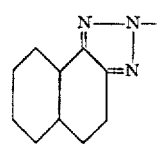

Such compounds can be prepared as set forth in the following illustrative examples. In these examples, unless otherwise indicated, parts are by weight, temperature is given in degrees centigrade, and percentages are percentages by weight.

Example 1

A solution is prepared from 18.4 parts of benzidine, 30 parts of 30% hydrochloric acid and 200 parts of water at 90°. The solution is allowed to cool to 60°; 20 parts of 30% hydrochloric acid are added; and the resultant suspension of benzidine dihydrochloride is cooled to 10° by the addition of ice. Then 14 parts of sodium nitrite, as a 30% solution in water, are added during five minutes, the temperature being maintained at 10° by further addition of ice as needed. After completion of the diazotization, the excess of nitrous acid is removed by addition of sulfamic acid, in amount sufficient to produce a negative test when the clear tetrazonium salt solution is spotted on starch-iodide paper.

Ice is then added to the solution to lower the temperature to 0°, and 30 parts of sodium bicarbonate are sifted into the solution. 25 parts of pyridine are added, followed immediately by a solution prepared from 42 parts of 8-amino-1, 3,6-naphthalenetrisulfonic acid, 100 parts of water and sufficient sodium carbonate to raise the pH of the solution to 7.5. Coupling is allowed to proceed at 0–5° for 16 hours. The pH of the mixture is then lowered to 5.5 with 25 parts of glacial acetic acid, and a solution of 12 parts of m-toluidine in 25 parts of water and 12 parts of 30% hydrochloric acid is added. The temperature of the coupling is allowed to rise to 20° during three hours. The coupling mixture is then treated with 28 parts of sodium hydroxide and the temperature is raised to 90° and held at this temperature during the addition of 50 parts of crystalline copper sulfate pentahydrate, and for one hour additional. 100 parts of 30% hydrochloric acid are then added, and the precipitated hydrochloride of the intermediate of the formula

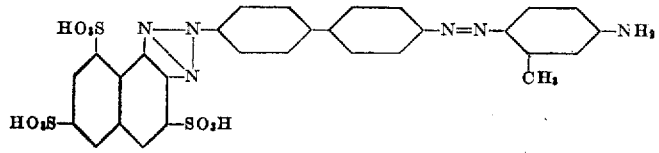

is filtered. This amino-azo compound is further purified by dissolving it in 1500 parts of water with the addition of sodium hydroxide to raise the pH to 11, heating to 95°, adding 30 parts of activated charcoal and 50 parts of a siliceous filtering aid, filtering, and salting the amino-azo compound from solution by addition of sodium chloride. After filtering the intermediate, it is reacted in aqueous solution at pH 6.5–7.5 and at 25° to 50° with phosgene until free amino group is no longer present. The resultant new dye is precipitated from solution by addition of sodium chloride, filtered and dried. It has the formula

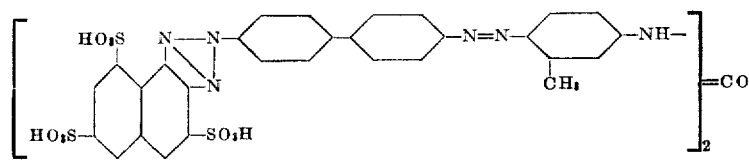

and is a yellow-brown powder which dyes cotton and regenerated cellulose in clear yellow shades of excellent fastness to light and to washing.

*Example II*

68.3 parts of the compound of the formula

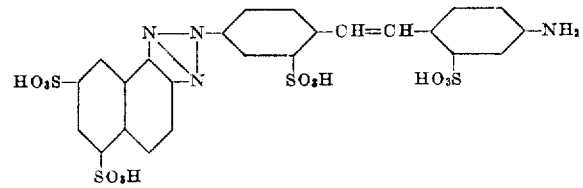

(prepared by coupling diazotized 4-amino-4'-nitro-2,2'-stilbenedisulfonic acid with 6-amino-1,3-naphthalenedisulfonic acid, oxidizing the nitro-amino-azo compound thus produced with cupric ammonium hydroxide solution to the corresponding nitro-naphtho (1,2)triazole, and reducing the nitro group with iron powder in dilute acetic acid solution) are diazotized directly in aqueous solution, and coupled at pH 3.5–4.5 with 10.7 parts of m-toluidine. The amino-azo compound thus produced is then reacted with phosgene in aqueous solution at pH 6.5–7.5 and 25° to 50° until free amino group is no longer present. The new dye which precipitates is filtered and dried. It is an orange-brown powder which dyes cotton and regenerated cellulose in yellow shades of excellent fastness to light and to washing. It has high tinctorial strength and has the formula

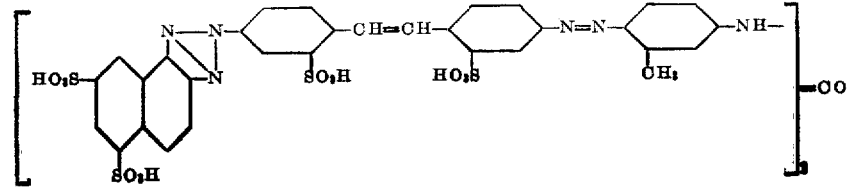

*Example III*

In Example II, while otherwise proceeding as described, if the 10.7 parts of m-toluidine are replaced with 13.7 parts of 5-methyl-o-anisidine, a new compound is produced which has the formula

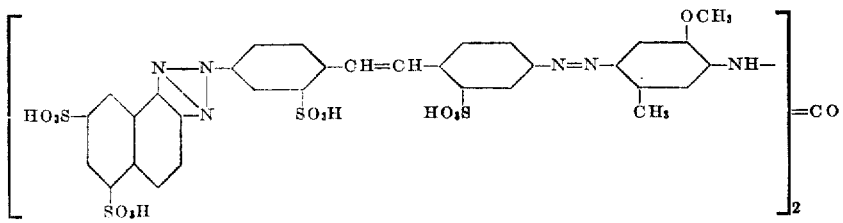

It is a red-brown powder which dyes cotton and regenerated cellulose in orange shades of excellent fastness to light and to washing.

*Example IV*

69.5 parts of the amino-azo compound used to prepare the dye in Example I are reacted with 7.65 parts of fumaroyl chloride. While vigorously stirring the dye intermediate solution, a solution of 7.65 parts of fumaroyl chloride in 40 parts of benzene, and a sodium carbonate solution are added dropwise to the dye solution at 25–30°, the sodium carbonate solution being added in sufficient amount to keep the reaction constantly approximately neutral. After all the fumaroyl chloride has been added, stirring is continued until no more free amino group is present. Then the new dye is separated from solution by salting with sodium chloride and the precipitated dye is filtered and dried. The new dye produced is a yellow-brown powder which dyes cotton and regenerated cellulose in yellow shades of excellent fastness to light and washing. It has the formula

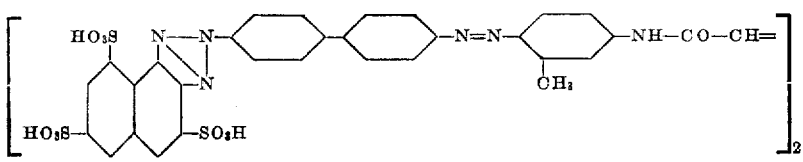

*Example V*

69.5 parts of the amino-azo compound used to prepare the dye of Example I are dissolved in neutral aqueous solution at 40°. While stirring vigorously, 9.2 parts of cyanuric chloride in 50 parts of acetone and another solution of sodium carbonate are added slowly dropwise to the dye intermediate solution, the sodium carbonate solution being added in sufficient amount to keep the reaction at pH 6.5–7.5. After the cyanuric chloride solution has been added completely, the temperature is maintained at 40° for 30 minutes and the pH maintained at 6.5–7.5. Then the temperature is raised to 90° and 4.7 parts of aniline are added. The temperature is maintained at 90° for an additional hour. The new dye, thus produced, is separated from solution by salting, filtered and dried. The new dye produced is a yellow-brown powder which dyes cotton and regenerated cellulose in yellow shades of excellent fastness to light and washing. It has the formula

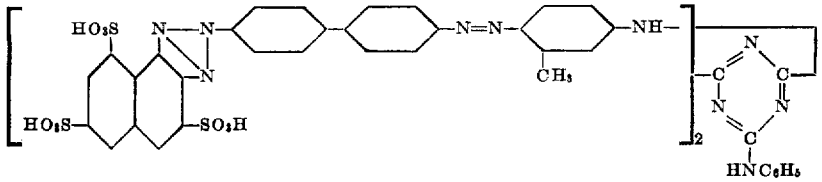

Example VI

The disazo compound (0.5 part), obtained according to Example II, is dissolved in a dyebath which contains 2000 parts of water. Cotton (100 parts) is entered at 40–50°; the bath is heated to 90–95° within 30 minutes; 20 parts of sodium chloride are added; and dyeing is performed for 30 minutes more at this temperature. The dyebath is then well-exhausted of color. The dyed fabric is rinsed cold and dried. The cotton is dyed a reddish-yellow shade of excellent fastness to light and very good fastness to washing.

The dyed fabric, when aftertreated with ureaformaldehyde in the usual manner well-known in the trade, shows markedly increased fastness to washing with no decrease in light fastness.

In the various compounds of the present invention, the sulfonic acid radicals can be substituted at different positions of the naphthotriazole nuclei than those shown in the illustrative examples. The number and positioning of the sulfonic acid radicals will depend on the structure of the napththylamine sulfonic acid which is initially coupled with the aminonitroaryl or diaminoaryl compound; useful naphthylamine sulfonic acids include 3-amino-1,5-naphthalenedisulfonic acid, 3-amino-2,7-naphthalenedisulfonic acid, 4-amino-1,6-naphthalenedisulfonic, acid, 5-amino-2,7-naphthalenedisulfonic acid 6-amino-1,3-naphthalenedisulfonic acid, 7-amino-1,3-naphthalenedisulfonic acid, 8-amino-1,6-naphthalenedisulfonic acid, 7-amino-1,3,6-naphthalenetrisulfonic acid, 7-amino-2,4,6-naphthalenetrisulfonic acid, 8-amino-1,3,5-naphthalenetrisulfonic acid, 8-amino-1,3,6-naphthalenetrisulfonic acid, etc.

Useful dyes having good light-fast and wash-fast characteristics can be prepared from the di and tri sulfonic acids of the naphthylamines. However, when the dyes are to be applied to fibrous materials containing a mixture of synthetics such as nylon or acetate and cellulosic fibers it is preferred to have 3 sulfonic acid radicals in the naphthotriazole nucleus when $R_1$ of the general structural formula is

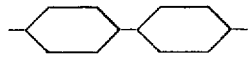

and 2 sulfonic acid radicals in the naphthotriazole nucleus when $R_1$ of the general structural formula is

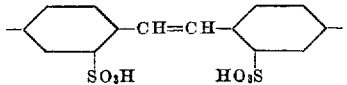

since the lower sulfonic acid compounds tend to stain nylon and acetate.

When fumaroyl chloride and cyanuric chloride are used to condense the amino-azo intermediates which form yellow dyes, the dyes so produced tend to be somewhat greener than when the same azo intermediates are condensed with phosgene. Cyanuric chloride is highly desirable as a condensing reagent for the azo compounds because it permits the formation of unsymmetrical dye molecules and in this way it is possible to vary the shade of the color and the dyeing properties of the dyestuff.

When cyanuric chloride is used as the condensing reagent the third chlorine can be replaced by reacting the condensation product with aniline as described in Example V or by the use of other reagents such as ammonia, lower alkyl amines or lower alkylated anilines.

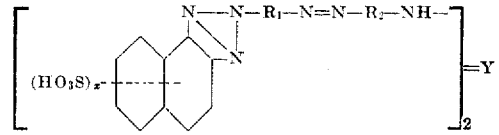

Equivalent amounts of other condensing agents such as fumaroyl bromide or dichlorides or dibromides of maleic, mesaconic, citraconic, bromofumaric, chlorofumaric, chloromaleic or bromomaleic acid can be used in lieu of fumaroyl chloride to effect azo condensations of the type generally illustrated by Example IV.

These new disazo compounds are water soluble and are particularly useful as substantive dyes to impart yellow and orange shades to cellulosic fibers. When used as dyestuffs, they have been found to possess an excellent affinity for cellulose; they show outstanding dyeing properties; the colors are unusually fast to light and the dyeings have outstanding wash-fastness. The wash-fastness and light-fastness of the colors are not adversely affected by conventional aftertreatments with heat hardenable resins used in various fabric finishing processes to impart desirable properties or effects to the fabric (e. g., stabilization, crease-proofing, durabilizing mechanical finish effects, etc.), and conventional dye fastening agents (usually cationic resinous materials or aminoaldehyde condensation products) used to increase wash-fastness of the dyeings have a far less adverse effect on the light-fastness of the dyes of this invention than on comparable yellow and orange dyes heretofore available.

A rather striking characteristic of these new disazo dyes is their unusually high light-fastness even though the dye molecule is not "metallized" (i. e., does not contain copper). Therefore these dyes can be used in many instances where the combination of wash and light-fastnesses are desirable but where metallized dyes are unsuitable, e. g., the dyeing of rubber-backed fabrics.

I claim:

1. A disazo compound having the following structure

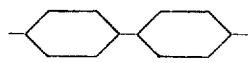

wherein:

$x$ is a whole number greater than 1 and less than 4;

$R_1$ is a radical selected from the group consisting of

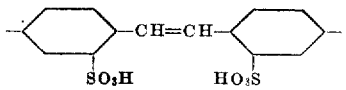

$R_2$ is a radical selected from the group consisting of

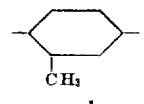

and

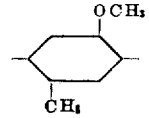

Y is a radical selected from the group consisting of —CO—, —CO—CH=CR₃—CO—, and

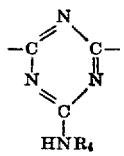

R₃ being a radical selected from the group consisting of —H, —Br, —Cl, and —CH₃ and R₄ being a radical selected from the group consisting of —H, -lower alkyl, -phenyl and -lower alkylated phenyl.

2. A disazo compound according to claim 1 wherein $x$ is 2 when $R_1$ is

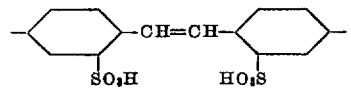

3. A disazo compound according to claim 1 wherein $x$ is 3 when $R_1$ is

4. The compound

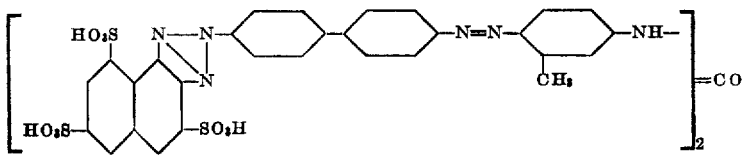

5. The compound

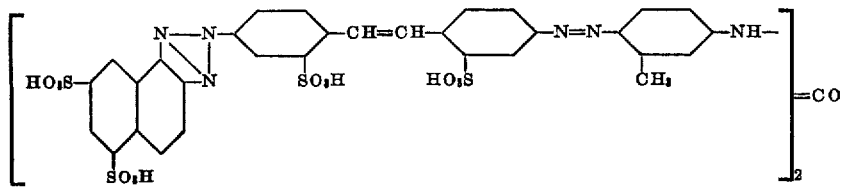

6. The compound

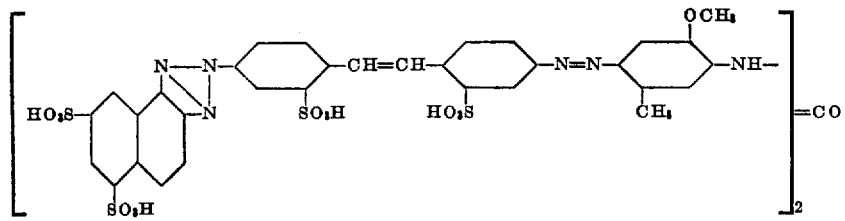

7. The compound

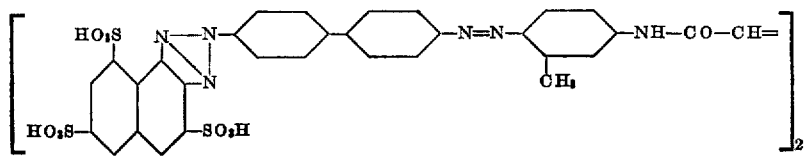

8. The compound

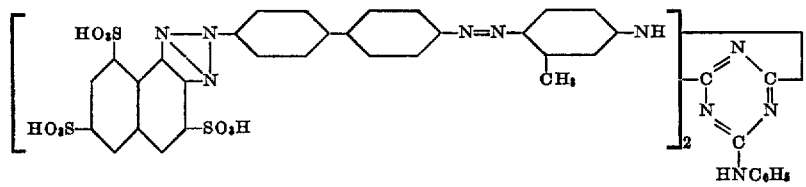

References Cited in the file of this patent

UNITED STATES PATENTS

| | | |
|---|---|---|
| 820,052 | Kirchhoff et al. | May 8, 1906 |
| 2,004,250 | Schindhelm et al. | June 11, 1935 |
| 2,270,478 | Schmid | Jan. 20, 1942 |
| 2,385,862 | Keller | Oct. 2, 1945 |
| 2,673,198 | Grandjean | Mar. 23, 1954 |

UNITED STATES PATENT OFFICE

CERTIFICATE OF CORRECTION

Patent No. 2,795,578                                                  June 11, 1957

James F. Feeman

It is hereby certified that error appears in the above numbered patent requiring correction and that the said Letters Patent should read as corrected below.

In the grant, lines 2 and 3, for "assignor to Althouse Chemical Co., of Worcester, Massachusetts, a corporation of Massachusetts," read -- assignor to Althouse Chemical Co., a division of Crompton & Knowles Corporation (a corporation of the Commonwealth of Massachusetts), of Worcester, Massachusetts, --; line 12, for "Althouse Chemical Co., its successors" read -- Althouse Chemical Co., a division of Crompton & Knowles Corporation, its successors --; in the heading to the printed specification, lines 3,4 and 5, for "assignor to Althouse Chemical Co., Worcester, Mass., a corporation of Massachusetts" read -- assignor to Althouse Chemical Co., a division of Crompton & Knowles Corporation ( a corporation of the Commonwealth of Massachusetts), Worcester, Mass. --.

Signed and sealed this 22nd day of April 1958.

(SEAL)
Attest:
KARL H. AXLINE
Attesting Officer

ROBERT C. WATSON
Commissioner of Patents